Feb. 7, 1933.  E. KNAPP ET AL  1,896,901
TRACTOR POWER COUPLING MECHANISM
Filed Dec. 2, 1927   4 Sheets-Sheet 1
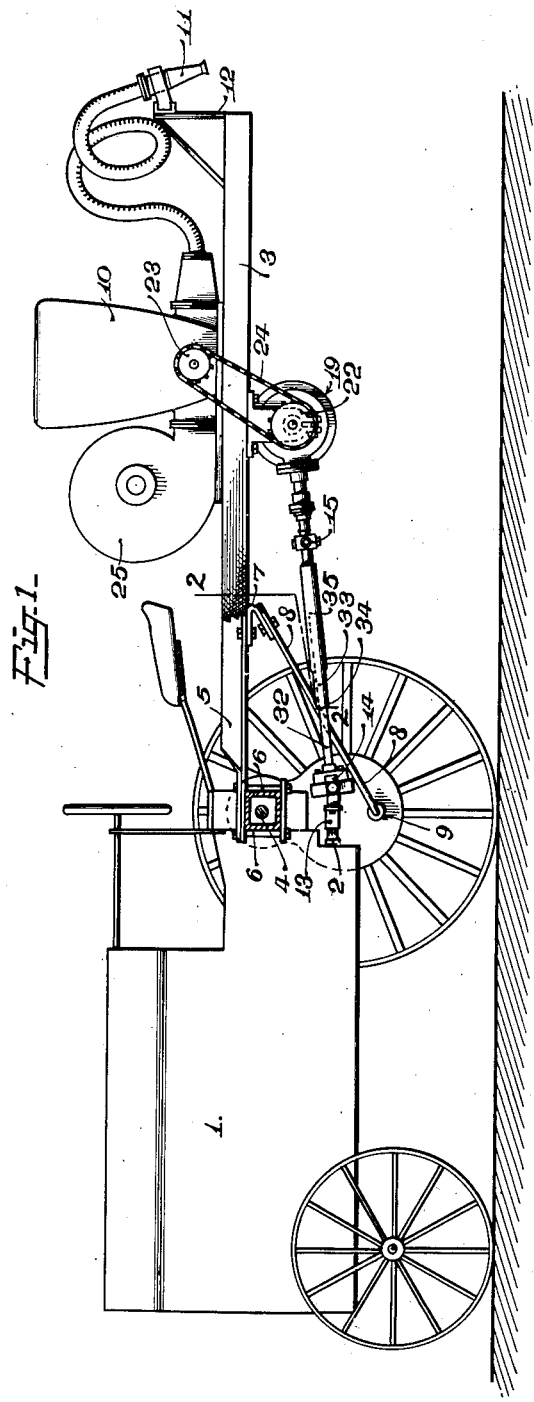
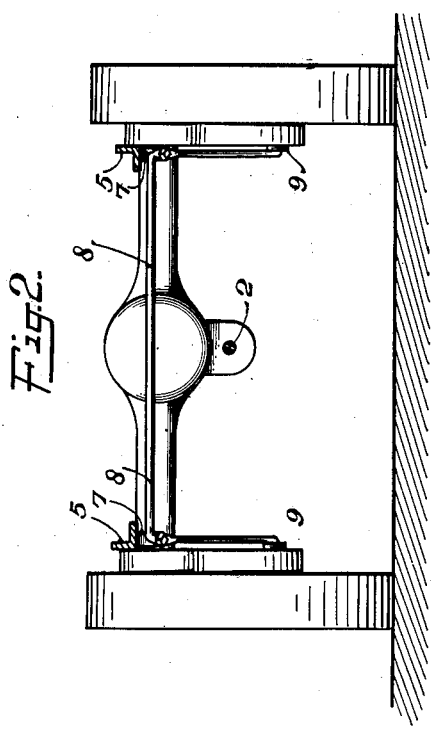
INVENTORS.
Edgar Knapp & Carl G. Allgrunn.
BY
A. S. McDaniel
THEIR ATTORNEY

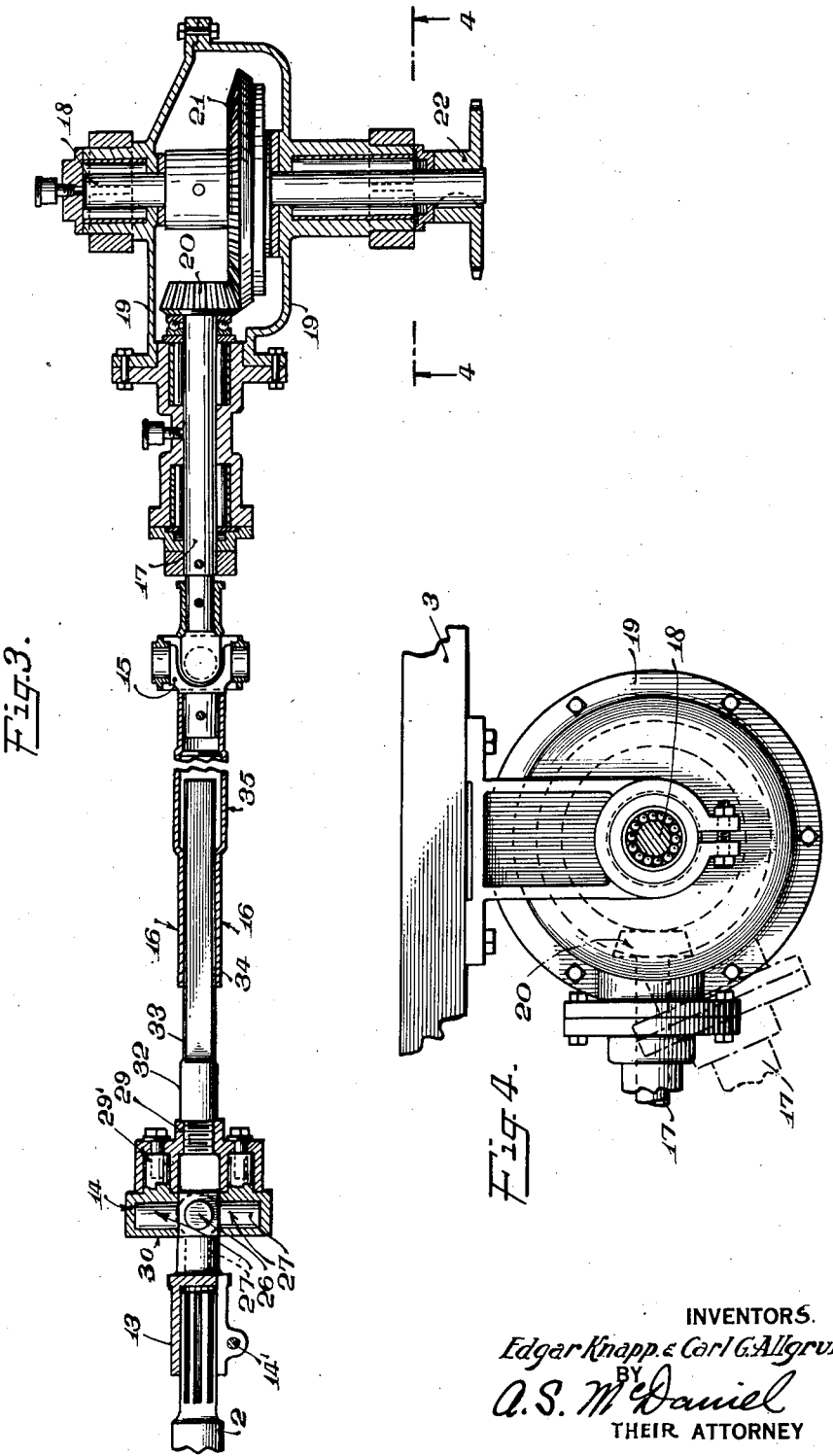

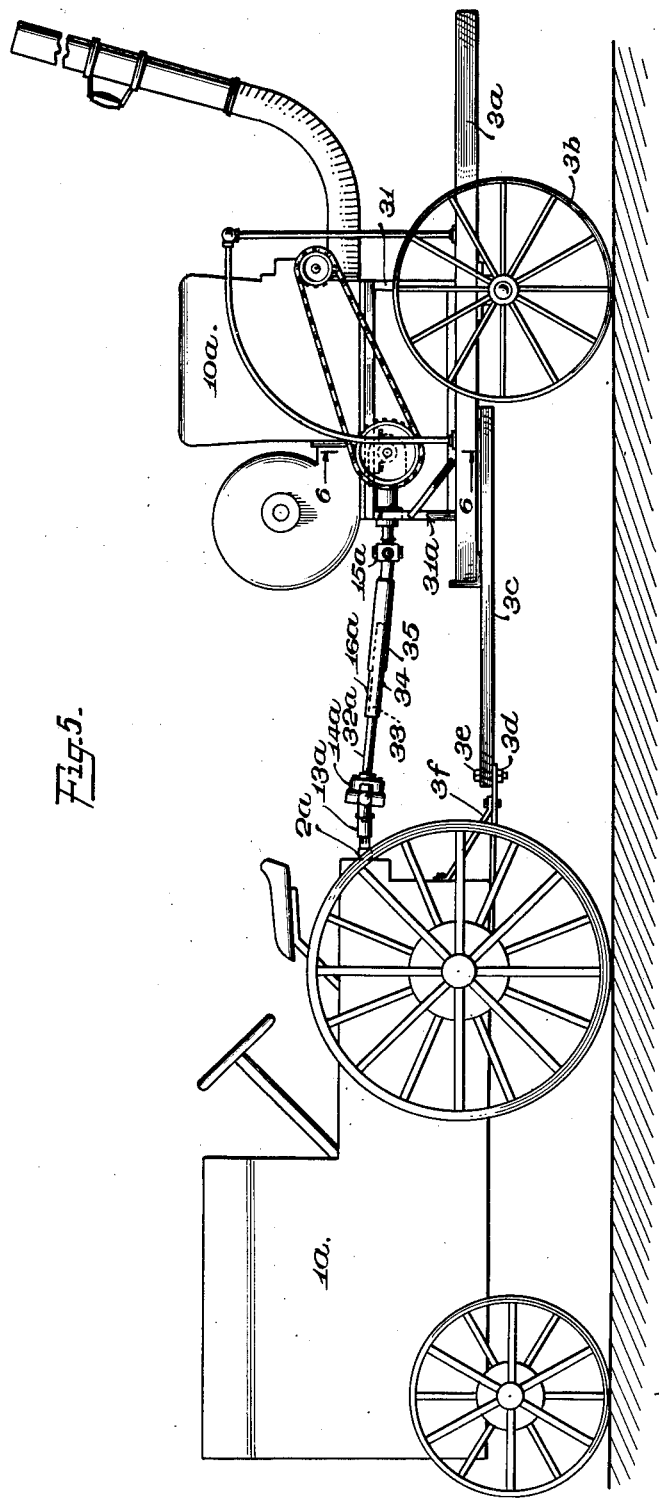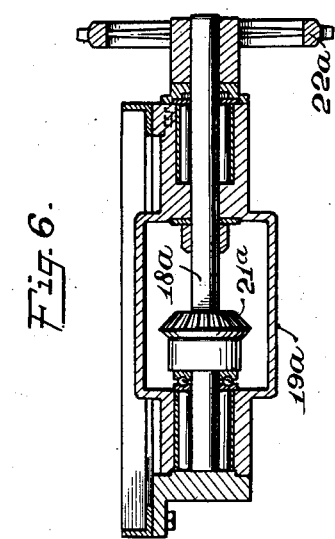

Feb. 7, 1933.　　　　E. KNAPP ET AL　　　　1,896,901
TRACTOR POWER COUPLING MECHANISM
Filed Dec. 2, 1927　　　4 Sheets-Sheet 4
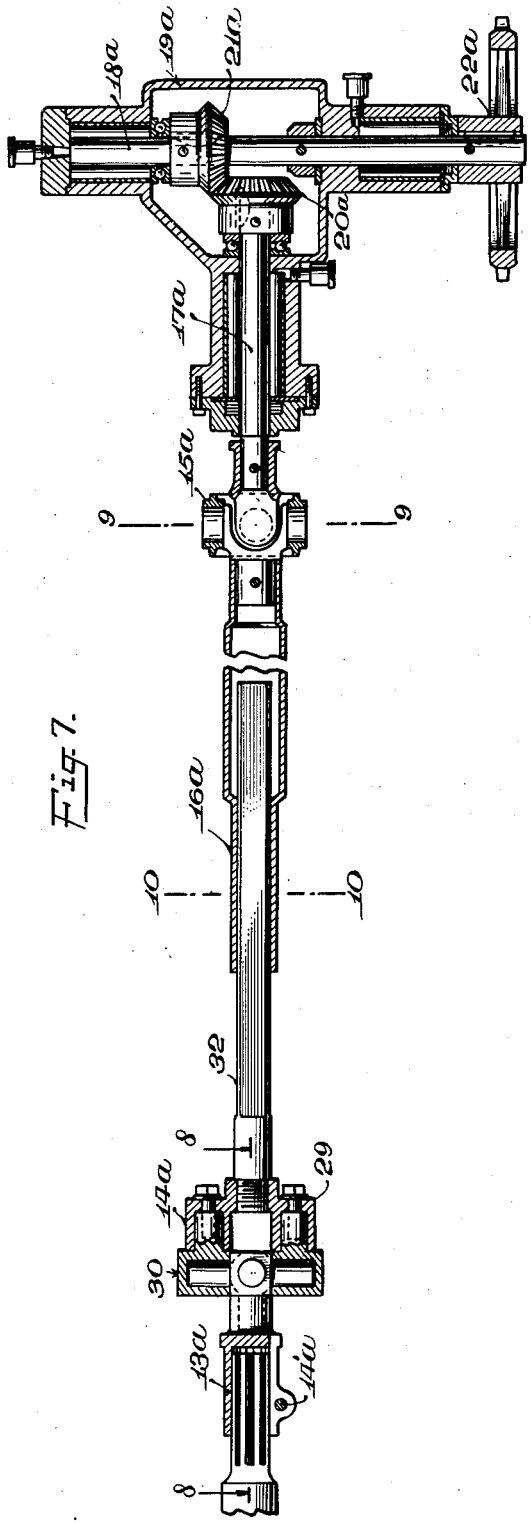
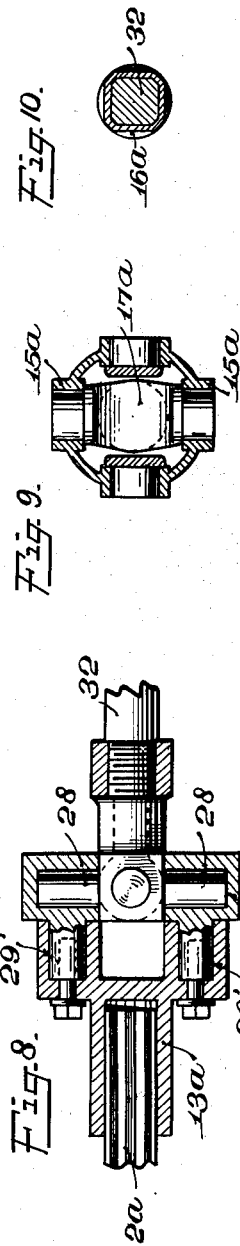
INVENTORS
Edgar Knapp & Carl G. Allgrunn
BY
A. S. McDaniel
THEIR ATTORNEY Patented Feb. 7, 1933

1,896,901

UNITED STATES PATENT OFFICE

EDGAR KNAPP AND CARL G. ALLGRUNN, OF MIDDLEPORT, NEW YORK, ASSIGNORS TO NIAGARA SPRAYER COMPANY, OF MIDDLEPORT, NEW YORK, A CORPORATION

TRACTOR POWER COUPLING MECHANISM

Application filed December 2, 1927. Serial No. 237,203.

This invention relates to an apparatus wherein a source of power for propelling a vehicle may be by suitable connection utilized also for operating a device transported with the vehicle, and the invention relates particularly to a coupling mechanism for causing some of the power generated by the motor which propels the device over the ground, to operate a device for distributing insecticides and fungicides over vegetation.

It has long been recognized that insects and fungus growths cause much destruction of vegetation, and many devices have been constructed for the purpose of applying liquid or powdered insecticides to growing plants and the like. Generally, the devices heretofore employed have been of a hand-operated type, but some power operated machines have been provided which are driven from a ground wheel of the vehicle on which the machine is transported. Other machines have been constructed which include a separate motor carried on the vehicle for the purpose of operating the distributing mechanism, and while some of these machines are quite efficient, they are nevertheless somewhat expensive due to the fact that an independent source of power for the distributing mechanism is required. While, in some instances, attempts have been made to utilize a tractor for supporting or propelling distributing mechanism of this character, and the tractor motor employed for operating the distributing mechanism, difficulty has been experienced in the turning of the tractors, particularly when the distributing mechanism is mounted on a trailer, which turning often resulted in great damage to the vegetation.

The present invention has for an object the provision of an apparatus capable of being used for depositing insecticides and the like upon vegetation without injury thereto, and the invention further contemplates such an apparatus adapted to be driven along the rows of vegetation and capable of being turned within a short space.

Another object of the invention is the provision of an apparatus for distributing insecticides, in which the distributing mechanism may be operated by the same source of power as that employed for propelling the device over the ground, and yet one in which the distributing device may be operated simultaneously with the transmission mechanism for propelling the device over the ground, or independently thereof.

A further object of this invention is the provision of an attachment for tractors, for distributing insecticides, which attachment may be quickly connected to or disconnected from the tractor without completely disassembling the attachment.

Other objects and advantages will be apparent from the following detailed description when considered in connection with the accompanying drawings, wherein Figure 1 is a side elevation of one form of apparatus constructed in accordance with this invention;

Fig. 2 is a sectional view taken on line 2—2 of Fig. 1, showing the rear axle of the tractor and the supporting frame for the distributing mechanism;

Fig. 3 is a sectional view of the power transmission mechanism shown in Fig. 1;

Fig. 4 is a sectional view taken on line 4—4 of Fig. 3;

Fig. 5 is a side elevation of a modified form of apparatus which is adapted to be operated in a manner similar to the structure shown in Fig. 1, but in which the distributing mechanism is supported upon a trailer;

Fig. 6 is a sectional view taken on line 6—6 of Fig. 5 through a portion of the power transmission mechanism;

Fig. 7 is a longitudinal sectional view similar to Fig. 3, but showing a slightly modified form of transmission mechanism of a type used in connection with the structure shown in Fig. 5;

Fig. 8 shows a sectional view through a wide angle universal joint as used at the forward end of the transmission mechanism as shown in Fig. 1 and Fig. 5, the view being taken perpendicular to the illustration of Fig. 7;

Fig. 9 is a vertical sectional view taken on line 9—9 of Fig. 7; and

Fig. 10 is a vertical sectional view taken on line 10—10 of Fig. 7, this view illustrating the universal joint 14, it is not necessary that the tractor be drawn upon level ground for disconnecting the distributing mechanism and platform, as the shaft 16 may be swung through a vertical angle of a width greater than would be possible by a universal joint of normal construction. If the bolts are first removed from the brackets 7 and the framework is permitted to drop before the clamp 13 is removed, no injury is done to the device, and therefore this attachment permits its connection or disconnection from the tractor by means of unskilled labor.

When attaching the framework 3 to the tractor, it may be supported at suitable height, and the tractor backed into position, whereupon the bolts of yokes 6 are secured in place. The connection 13 may be coupled to the power take-off shaft 2 initially, or it may be coupled after the framework 3 is in place. The shaft 16 may be shortened by virtue of its telescopic portion and the connection 13 slipped over the power take-off shaft 2 and secured in position as previously described. However, if desired, the framework 3 may be placed upon the ground so as to rock on the housing 9, whereby the angle irons 5 are moved into positions where they can be bolted to the axle housing 4, when the same is entirely elevated. The framework 3 may be conveniently elevated by securing the brackets 7 to the brace 8, and thereafter swinging the framework about the pivots 9 of the brace 8, after which the angle irons 5 are bolted in place by means of yokes 6. Connection 13 may be clamped to the power take-off shaft 2 either before or after bolting the platform 6 in place, as its telescopic construction permits lengthening or shortening thereof. It will be seen from the foregoing description that the platform may be readily attached or removed by a little labor in a short period.

In the construction shown in Fig. 5, it will be noted that the distributing mechanism is supported upon a platform 3a, which is, in turn, mounted upon the ground wheels 3b so that the framework and the wheels together with the drawbar 3c may be utilized as a trailer.

The drawbar 3c is adapted to be pivotally connected to the tractor at 3d by a pin bolt 3e which cooperates with a brace 3f carried on the tractor. In this modified construction, the power transmitting mechanism is arranged above the drawbar 3c as well as above the framework 3a. The power transmitting mechanism is adapted to be connected to the power take-off shaft 2a by means of the connection 13a, which connection is of the same formation as the connection 13 employed with the construction shown in Figure 1.

Mounted on the framework 3a is a powder distributing mechanism, of the same general type described in connection with Figure 1, and this mechanism is connected with the power take-off shaft 2a by means of the power transmission shaft 16a, and cooperating shafts and gears; the shaft 16a having arranged at its forward end a wide angle universal joint 14a, and at its rearward end a universal joint 15a.

While the shafts of the power transmitting mechanism, the universal joints, and the gears are similar to those employed in connection with the power transmitting mechanism shown in Fig. 1, the housing 19a and the gear 21a, together with the shafts 17a and 18a, are slightly modified as will be apparent from the drawings. The distributing mechanism 10a may be mounted above the framework 3a upon a support 31, which permits the shaft 16a of the power transmitting mechanism to be nearly horizontal, and therefore eliminates to some extent the wear of the universal joint when the device is operating.

The wide angle universal joint 14a is of decided importance in the operation of the device illustrated in Fig. 5, as will be apparent from the description of the operation of this modified form of the device.

In operating the device illustrated in Fig. 5, the tractor draws the trailer, with the distributing mechanism 10a mounted thereon as described, along the rows of vegetation, and the tractor is so operated that the power take-off shaft 2a causes the transmission of power to the powder distributing mechanism 10a, which is, in turn, operated for discharging a cloud of dust-laden air through the nozzle 11a upon the vegetation.

As the universal joint 14a can transmit power through a relatively wide angle, the passage of the tractor and trailer over extremely uneven ground does not affect the efficient operation of the device. When the end of a row of vegetation being treated is reached, it is possible to make a turn which involves an angular displacement of the trailer with respect to the tractor greater than 90°, merely by discontinuing the rotation of the power take-off shaft 2*a*, as the universal joint 14*a* would not permit rotation thereof while an angular displacement of such degree exists. However, in normal operation a machine for treating vegetation would be stopped while turning, to avoid wasting of material during the turning operation, as the turning operation required a reduction in the speed of advancement over the ground, and, furthermore, the turning operation usually takes place at a point beyond the ends of the rows of vegetation.

The shaft 16 of Fig. 1 and the shaft 16*a* of Fig. 5, as stated, are of similar construction, and it will suffice therefore to describe the shaft shown in Fig. 1. The shaft 16 is formed of a bar section 32 which is securely attached to the yoke 29 of universal joint 14.

The bar section 32 is provided with a squared portion 33, which is adapted to cooperate with a squared portion 34 of a tubular section 35 for keying the bar section and the tubular section together for rotation. The tubular section 35 has the squared portion 34 arranged at the extreme end thereof, and the portion of the tubular section 35 arranged rearwardly of the section 34 is of such size that it does not contact with the bar section 32 in any way. The end of the tubular section 35 is secured to the universal joint 15 for causing the rotation thereof during the operation of the mechanism. It will, therefore, be apparent that the telescoping connection of the shaft 16 permits the extension and contraction thereof as the framework 3 is vibrated, so that it assumes a position at an angle to the tractor, and that due to the fact that that portion of the tubular section 35 which cooperates with the bar section 32 for keying the two sections together, is relatively short, dust or grit, which may be present in the art in which the device is operated, will cause friction to exist against the extension and contraction of the shaft 16 to a minor or ineffective degree, the end of the bar section 32 extending into the tubular section 35 beyond the section 34, in no way aiding the frictional contact.

Although I have described above the preferred form of my invention, many variations in the construction and operation may be made without departing from the spirit of the invention.

What we claim is:

1. In a device of the class described, a slip-joint transmission shaft, comprising a tubular shaft internally squared throughout a portion of its length and having its bore adjacent said squared portion of a diameter greater than the maximum diameter of the squared portion, an externally squared shaft slidably fitted in said internally squared portion and adapted to extend into and be contained within said larger bore of the tubular shaft a distance not less than the normal slip of said shafts during operation thereof.

2. A power transmission shaft of variable length, comprising a tubular portion and a shaft portion slidably keyed therein, said tubular portion being keyed to the shaft portion over a length predetermined to transmit the desired driving torque, the remainder of the tubular portion being enlarged so as to contain and permit free entrance of the shaft without surface friction.

In testimony whereof we affix our signatures.

EDGAR KNAPP.
CARL G. ALLGRUNN.